US008575890B2

(12) United States Patent  
Hwang

(10) Patent No.: US 8,575,890 B2
(45) Date of Patent: Nov. 5, 2013

(54) MOBILE TERMINAL HAVING RECHARGE MENU SETTING FUNCTION AND INTER-RECHARGING METHOD USING THE SAME

(75) Inventor: Shi-Youn Hwang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 12/275,688

(22) Filed: Nov. 21, 2008

(65) Prior Publication Data

US 2009/0140692 A1  Jun. 4, 2009

(30) Foreign Application Priority Data

Nov. 23, 2007  (KR) .................. 10-2007-0120507

(51) Int. Cl.
*H02J 7/00*  (2006.01)
(52) U.S. Cl.
USPC ........................... 320/103; 320/108; 455/573
(58) Field of Classification Search
USPC .................. 320/103, 108; 455/573
See application file for complete search history.

(56) References Cited

U.S. PATENT DOCUMENTS

| 4,282,474 | A | * | 8/1981 | Wyzenbeek | 320/103 |
| 5,541,489 | A | * | 7/1996 | Dunstan | 320/134 |
| 5,811,958 | A | * | 9/1998 | Yamamoto | 320/101 |
| 6,429,625 | B1 | * | 8/2002 | LeFevre et al. | 320/155 |
| 7,772,802 | B2 | * | 8/2010 | Manico et al. | 320/108 |
| 8,198,858 | B2 | * | 6/2012 | Kim et al. | 320/108 |
| 2004/0066174 | A1 | * | 4/2004 | Choi | 320/149 |
| 2005/0134213 | A1 | * | 6/2005 | Takagi et al. | 320/108 |
| 2007/0103110 | A1 | * | 5/2007 | Sagoo | 320/109 |
| 2007/0252553 | A1 | * | 11/2007 | Mori et al. | 320/114 |
| 2009/0033280 | A1 | * | 2/2009 | Choi et al. | 320/108 |
| 2009/0156268 | A1 | * | 6/2009 | Kim et al. | 455/573 |

FOREIGN PATENT DOCUMENTS

WO  WO 2007089086 A1 *  8/2007

* cited by examiner

*Primary Examiner* — Yalkew Fantu
*Assistant Examiner* — Manuel Hernandez
(74) *Attorney, Agent, or Firm* — Lee, Hong, Degerman, Kang & Waimey

(57) ABSTRACT

A non-contact recharging apparatus and method provides a recharge menu to a first mobile terminal when performing non-contact recharging using inductive coupling. A user can set and operate a menu for recharging a second mobile terminal according to the recharge menu to perform inter-recharging between the mobile terminals. A recharge menu setting state is displayed in the form of icon, and the mobile terminal performs short-range communication with the counterpart terminal during the recharging to exchange information about the remaining battery capacity and the amount of current. The exchanged information is displayed on a display module such that the user can easily check which one of the mobile terminals is being recharged and can also check the recharge level of the mobile terminal being recharged.

16 Claims, 7 Drawing Sheets

```
RECHARGE MENU
INTER-RECHARGE MENU

COUNTERPART TERMINAL      ☐
MOBILE TERMINAL           ☑      — 151
CONNECT TO RECHARGING     ☐
DEVICE
```

```
SETTING FOR COUNTERPART
TERMINAL RECHARGE

RECHARGING TIME     ☐
RECHARGING LEVEL    ☐
OUTPUT INFORMATION  ☑
```

```
SETTING FOR OUTPUT INFORMATION

COLOR          ☐
SOUND          ☐
CHARACTER      ☐
RECHARGE ICON  ☑
```

MOBILE TERMINAL HAVING RECHARGE MENU SETTING FUNCTION AND INTER-RECHARGING METHOD USING THE SAME

CROSS REFERENCE TO RELATED APPLICATIONS

Pursuant to 35 U.S.C. §119(a), the present application claims the benefit of earlier filing date and right of priority to Korean Application No. 10-2007-0120507, filed on Nov. 23, 2007, the contents of which are hereby incorporated by reference herein in their entirety.

1. Field of the Invention

The present invention relates to non-contact re-charging of a mobile terminal. In particular, the present invention is directed to a mobile terminal having a recharge menu setting function and an inter-recharging or mutual recharging method using the mobile terminal.

2. Description of the Related Art

A mobile terminal may be configured to perform various functions. For example, the various functions of the mobile terminal include data and voice communications, capturing images and video via a camera, recording audio, reproduction of music files via a speaker system, and displaying images and video on a display. Some terminals may further include additional functions such as game playing and multimedia playing. More recently, mobile terminals have been configured to receive broadcast and multicast signals which permit viewing of contents such as videos and television programs.

Efforts are ongoing to support and increase the functionality of mobile terminals. Such efforts include software and hardware improvements, as well as changes and improvements in the structural components which form the mobile terminal.

Recently, as users may view videos or TV programs upon receiving broadcast or multicast signals via mobile terminals, a large capacity battery is needed. However, such a battery satisfying the increased capacity has not been developed yet. As a result, unless a re-charging time and re-charging method are properly determined based on the remaining battery capacity in order to perform a re-charging operation before the battery runs out, users may not be able to view videos or TV programs via the mobile terminals.

Thus, various re-charging devices and relevant methods for re-charging batteries have been developed. In general, in order to re-charge a mobile terminal battery, a re-charging unit, such as a re-charging body or a re-charging device, must be connected to a power source to supply electric energy to the battery. The re-charging unit and the battery contact each other via contact terminals on their respective outer surfaces to selectively re-charge the battery.

However, the presence of the contact terminals on the re-charging unit and the battery changes the appearance of a mobile terminal. Further, the contact terminals may be exposed to moisture, resulting in loss of the charged energy. Furthermore, the contact terminals may not properly contact with each other, thus failing to properly re-charge the battery. In order to avoid such problems, a method for re-charging the battery in a non-contact or contact-less manner, without the contact terminals on the re-charging unit and the battery or a cell, has been proposed and used for some applications.

One example of a non-contact re-charging method is a contact-less re-charging method using inductive coupling. In the non-contact re-charging method using the inductive coupling, a recharging unit includes a primary coil and a rechargeable battery of a mobile terminal, which is a target to be recharged, includes a secondary coil. Thus, when the mobile terminal having the rechargeable battery approaches the recharging unit, the rechargeable battery is recharged according to the inductive coupling between the primary coil and the secondary coil.

The non-contact re-charging method using the inductive coupling may be applicable to inter-terminal recharging between two mobile terminals. In this case, one mobile terminal includes the primary coil and the other mobile terminal includes the secondary coil. This is simply called inter-recharging in the present application.

However, when the inter-recharging is performed by the non-contact recharging method using the inductive coupling, the two mobile terminals are recharged according to the inductive coupling between the primary coil and the secondary coil by merely bringing the two terminals closely together. Thus, a user cannot set various information, such as a recharge time or recharge amount, for re-charging nor check which one of the two mobile terminals is currently being recharged.

SUMMARY OF THE INVENTION

Accordingly, an object of the present invention is to address the above-noted and other problems. Another object of the present invention is to provide a mobile terminal and its inter-recharging method capable of effectively performing inter-recharging by using non-contact recharging method. Still another object of the present invention is to provide a mobile terminal and its inter-recharging method capable of setting various recharge information by providing a menu with regard to recharging when inter-recharging is performed by using a non-contact recharging method.

To achieve these and other advantages and in accordance with the purpose of the present invention, as embodied and broadly described herein, the present invention provides in one aspect a mobile terminal having a recharge menu setting function. The mobile terminal includes a user interface providing a recharge menu to perform inter-recharging with a counterpart terminal, a coil connected with a recharger, to which current is applied when the inter-charging is performed by non-contact recharging, and a controller controlling the current flowing to the coil according to a menu setting input through the recharge menu, and performing a controlling operation during the inter-charging with the counterpart terminal, wherein the non-contact recharging is performed according to inductive coupling.

In an aspect of the present invention, the coil of the mobile terminal is operated as a primary coil when the counterpart terminal is recharged by the mobile terminal and the coil is operated as a secondary coil when the mobile terminal is recharged by the counterpart terminal. The recharge menu on the mobile terminal includes a inter-recharge menu and the inter-recharge menu includes a menu item for recharging the counterpart terminal and a menu item for recharging the mobile terminal by the counterpart terminal.

In an aspect of the present invention, the recharge menu may include a menu for recharging by connecting to a recharging device. The recharge menu may further include a recharge time, a recharge level and a menu item for setting output information when the recharging is completed. The output information includes at least one of a color, sound, a character, or a recharge icon to be set.

In an aspect of the present invention, the controller applies the current to the coil and displays a counterpart recharge icon when the counterpart terminal is recharged by the non-contact recharging and the controller detects the current flowing across the coil and displays at least one of an icon indicating that the mobile terminal is recharged or a non-contact recharge icon when the mobile terminal is recharged by the counterpart terminal.

In an aspect of the present invention, the mobile terminal further includes a user input unit receiving key data for setting the recharge menu, a display unit displaying the recharge menu when a specific key data is input via the user input unit, and displaying information about a recharge menu setting state and operation, and a short range communication unit communicating with the counterpart terminal during the non-contact recharging to exchange battery information and current information. The short range communication unit includes an infrared transmitting/receiving unit for performing infrared communication.

In an embodiment of the present invention, a method for performing non-contact recharging, using inductive coupling to inter-recharge a mobile terminal, includes providing a recharge menu for performing the non-contact recharging and performing inter-recharging with a counterpart terminal by controlling current flowing across a coil according to a menu setting input via the recharge menu. Performing the inter-charging includes operating the coil as a primary coil when the counterpart terminal is recharged and operating the coil as a secondary coil when the mobile terminal is charged by the counterpart terminal.

In an aspect of the present invention, performing the inter-recharging includes displaying a menu setting selected by a user from the recharge menu as an icon, performing short range communication with the counterpart terminal during the recharging to exchange battery information, displaying the exchanged battery information, and checking whether the recharging has been completed by comparing the exchanged battery information.

In an aspect of the present invention, displaying the menu setting includes displaying a counterpart recharge icon when the user selects recharging of the counterpart terminal by the mobile terminal and displaying a non-contact recharge icon when the user selects recharging of the mobile terminal by the counterpart terminal. Displaying the menu setting may further include displaying an icon indicating that the mobile terminal is recharged. The method for performing non-contact recharging may further include automatically stopping the inter-recharging when recharge levels of the mobile terminal and the counterpart terminal are substantially the same.

Further scope of applicability of the present invention will become apparent from the detailed description given hereinafter. However, it should be understood that the detailed description and specific examples, while indicating preferred embodiments of the invention, are given by illustration only. Various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
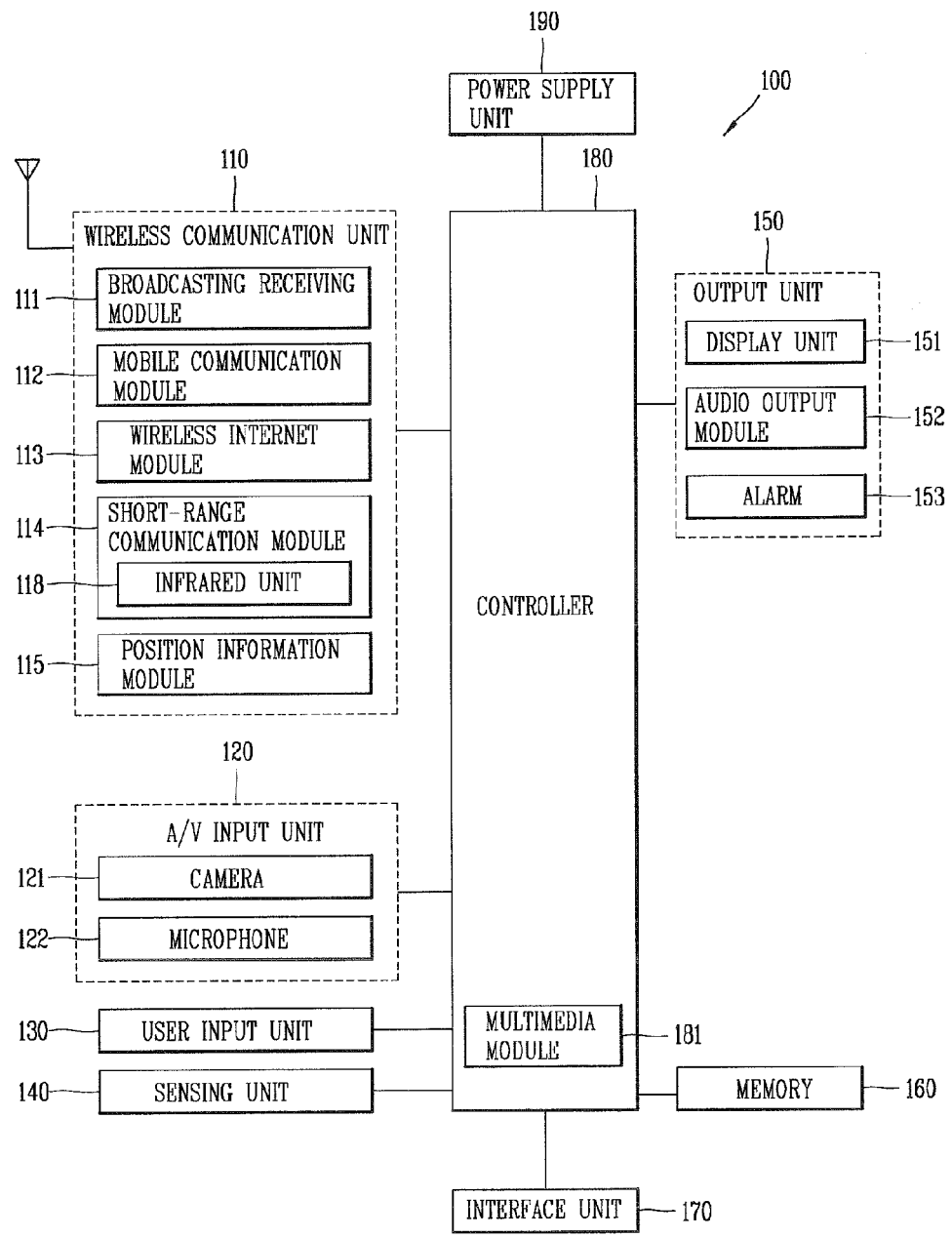
FIG. 1 is a schematic block diagram of a mobile terminal implementing an embodiment of the present invention.

FIG. 1 is a block diagram of a mobile terminal according to an embodiment of the present invention. The mobile terminal 100 may be implemented in various configurations of mobile terminals. Examples of such terminals include mobile phones, smart phones, notebook computers, digital broadcast terminals, personal digital assistants (PADs), portable multimedia players (PMP), navigation devices, and the like.

The mobile terminal 100 as shown in FIG. 1 may include a wireless communication unit 110, an A/V (Audio/Video) input unit 120, a user input unit 130, a sensing unit 140, an output unit 150, a memory 160, an interface unit 170, a controller 180, a power supply unit 190, or the like.

FIG. 1 shows the mobile terminal 100 having various components, but it is understood that implementing all of the illustrated components is not a requirement. Greater or fewer components may alternatively be implemented. The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and a terrestrial channel. The broadcast managing server may refer to a system that generates and transmits a broadcast signal and/or broadcast associated information or a server that receives a previously generated broadcast signal and/or broadcast associated information and transmits the same to a terminal. Examples of the broadcast associated information include information regarding a broadcast channel, a broadcast program, and a broadcast service provider. The broadcast signal may include a TV broadcast signal, a radio broadcast signal, and a data broadcast signal. Also, the broadcast signal may further include a broadcast signal combined with a TV or radio broadcast signal.

The broadcast associated information may be provided also via a mobile communication network that operate according to standards such as 3GPP, 3GPP2, IEEE, CDMA, GSM, OMA, and so-called 4G techniques, and in this case, the broadcast associated information may be received by the mobile communication module 112.

The broadcast signal may exist in various forms. For example, it may exist in the form of an electronic program guide (EPG) of digital multimedia broadcasting (DMB) or electronic service guide (ESG) of digital video broadcast-handheld (DVB-H).

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). The broadcast receiving module 111 is configured to be suitable for every broadcast system that provides a broadcast signal as well as the above-mentioned digital broadcast systems. Broadcast signals and/or broadcast-associated information received via the broadcast receiving module 111 may be stored in the memory 160 or other type of storage medium.

The mobile communication module 112 transmits and/or receives radio signals to and/or from at least one of a base station, such as access points and Node Bs, an external terminal or other user devices and a server or other network entities. Such radio signals may include a voice call signal, a video call signal or various types of data according to text and/or multimedia message transmission and/or reception.

The wireless Internet module 113 supports Internet access for the mobile terminal 100. This module may be internally or externally coupled to the mobile terminal 100.

The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), and ZigBee™. For example, the short-range communication module 114 includes an infrared unit 118.

The location information module 115 is a module for checking or acquiring a location or position of the mobile terminal 100. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

The A/V input unit 120 is configured to receive an audio or video signal. The A/V input unit 120 may include a camera 121, 123 or other image capture device and a microphone 122 or other sound pick-up device. The camera 121, 123 process image data of still pictures or videos obtained by an image capture device in a video capturing mode or an image capturing mode. The processed image frames may be displayed on a display unit 151 or other visual output device.

The image frames processed by the camera 121, 123 may be stored in the memory 160 or other storage medium or transmitted via the wireless communication unit 110. Two or more cameras 121, 123 may be provided according to the configuration of the mobile terminal 100.

The microphone 122 may receive sounds or audible data via a microphone in a phone call mode, a recording mode, a voice recognition mode, and the like, and can process such sounds into audio data. The processed audio or voice data may be converted for output into a format transmittable to a mobile communication base station or other network entity via the mobile communication module 112 in case of the phone call mode. The microphone 122 may include various types of noise canceling or suppression algorithms to cancel or suppress noise or interference generated in the course of receiving and transmitting audio signals.

The user input unit 130 or other user input device may generate key input data from commands entered by a user to control various operations of the mobile terminal. The user input unit 130 allows the user to enter various types of information, and may include a keypad, a dome switch, a touch pad, i.e., a touch sensitive member that detects changes in resistance, pressure, capacitance, and the like, a jog wheel, a jog switch, and the like. In particular, when the touch pad is overlaid on the display unit 151 in a layered manner, it may be called a touch screen.

The sensing unit 140 or other detection means detects a current status of the mobile terminal 100 such as an opened or closed state of the mobile terminal 100, a location of the mobile terminal 100, a presence or absence of user contact, such as touch inputs, with the mobile terminal 100, orientation of the mobile terminal 100, an acceleration or deceleration movement and direction of the mobile terminal 100, and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 or other connection means serves as an interface with at least one external device connected with the mobile terminal 100. For example, the external devices may include wired or wireless headset ports, external power supply or battery re-charger ports, wired or wireless data ports, memory card ports, ports for connecting a device having an identification module, audio input/output (I/O) ports, video I/O ports, or earphone ports.

Here, the identification module may be a chip or other element with memory or storage capabilities that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port or other connection means. The interface unit 170 may be used to receive inputs, such as data, information, and power, from an external device and transfer the received inputs to one or more elements within the mobile terminal 100 or may be used to transfer data between the mobile terminal and an external device.

The output unit 150 is configured to provide outputs in a visual, audible, and/or tactile manner, for example, audio signal, video signal, alarm signal, and vibration signal. The output unit 150 may include the display unit 151, an audio output module 152, and an alarm unit 153.

The display unit 151 may output information processed in the mobile terminal 100. For example, when the mobile terminal 100 is in a phone call mode, the display unit 151 may display a User Interface (UI) or a Graphic User Interface (GUI) associated with a call or other communication, such as text messaging and multimedia file downloading. When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED), a flexible display, or a three-dimensional (3D) display. The mobile terminal 100 may include two or more display units or other display means according to its embodiment. For example, the mobile terminal 100 may include an external display unit that can be viewed even if the mobile phone is closed and an internal display unit that can be viewed if the mobile phone is opened.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function, for example, a call signal reception sound and a message reception sound, performed by the mobile terminal 100. The audio output module 152 may include a speaker, a buzzer, or other sound generating device.

The alarm unit 153 or other type of user notification means may provide outputs to inform about an occurrence of an event of the mobile terminal 100. Typical events may include call reception, message reception, and key or button inputs. In addition to audio or video outputs, the alarm unit 153 may provide outputs in a different manner to inform about an occurrence of an event. For example, the alarm unit 153 may provide outputs in the form of vibrations or other tactile outputs. When a call, a message, or some other incoming communication is received, the alarm unit 153 may provide tactile outputs or vibrations to inform the user. By providing tactile outputs, the user can recognize the occurrence of various events even if his mobile phone is in his pocket. Outputs informing about the occurrence of an event may be also provided via the display unit 151 or the audio output module 152.

The memory 160 or other storage means may store software programs or the like used for the processing and controlling operations performed by the controller 180, or may temporarily store data, such as a phonebook, messages, still images, and video, that have been input or to be output.

The memory 160 may include at least one type of storage medium including a flash memory, a hard disk, a multimedia card, a card-type memory, such as SD or DX memory, a Random Access Memory (RAM), a Static Random Access Memory (SRAM), a Read-Only Memory (ROM), an Electrically Erasable Programmable Read-Only Memory (EE-PROM), a Programmable Read-Only memory (PROM) magnetic memory, a magnetic disk, and an optical disk. Also, the mobile terminal 100 may cooperate with a network storage device that performs the storage function of the memory 160 over a network connection.

The controller 180 such as a microprocessor typically controls the general operations of the mobile terminal 100. For example, the controller 180 performs controlling and processing associated with voice calls, data communications, and video calls. In addition, the controller 180 may include a multimedia module 181 for reproducing or playing back multimedia data. The multimedia module 181 may be configured within the controller 180 or may be configured to be separated from the controller 180.

The power supply unit 190 receives external power via a power cable connection or internal power via the battery of the mobile phone and supplies appropriate power required for operating respective elements and components under the control of the controller 180.

Various embodiments described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application or program written in any suitable programming language. The software codes may be stored in the memory 160 and executed by the controller 180.

So far, the mobile terminal 100 has been described from the perspective of its functions. Hereinafter, external elements of the mobile terminal 100 will be described from the perspective of their functions with reference to FIGS. 2 and 3. Mobile terminal 100 may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
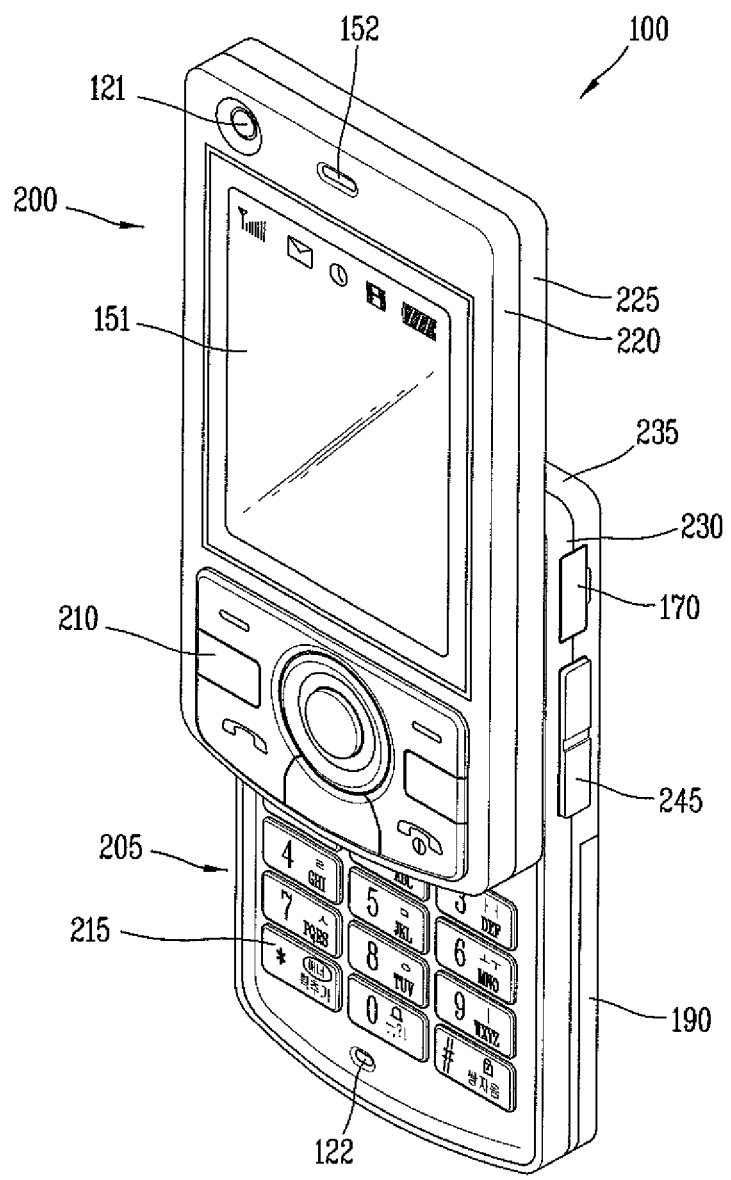
FIG. 2 is a front perspective view of a mobile terminal implementing an embodiment of the present invention.

FIG. 2 is a front perspective view of the mobile terminal according to an embodiment of the present invention. The mobile terminal 100 includes a first body 200 and a second body 205 that can be slidably moved along at least one direction with respect to the first body 200. In case of the folder type mobile phone, it includes a second body that can be folded or unfolded with respect to the first body.

A state in which the first body is disposed to overlap with the second body 205 may be called a closed configuration, and as shown in FIG. 2, a state in which at least a portion of the second body 205 is exposed may be called an open configuration. In the closed configuration, the mobile terminal 100 mainly operates in a standby or idle mode, and the standby mode may be released upon user manipulation. The mobile terminal 100 operates mainly in the calling mode or the like in the open configuration, and it can be changed to the standby mode with the lapse of time or upon user manipulation.

The case, casing, housing, or cover constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225. The cases may be formed by injection-molding a synthetic resin or may be made of a metallic material such as stainless steel (STS) or titanium (Ti).

The display unit 151, the audio output module 152, the camera 121 or the first user input unit 210 may be located at the first body, 200, specifically, on the first front case 220 of the first body 200. The display unit 151 may include an LCD (Liquid Crystal Display) and an OLED (Organic Light Emitting Diode) and visually displays information. A touch pad may be overlaid in a layered manner on the display unit 151 to allow the display unit 151 to function as a touch screen to input information via user's touch.

The audio output unit 152 may be implemented in the form of a speaker or other sound producing device. The camera 121 may be implemented to be suitable for capturing images or video with respect to the user and other objects.

Like the first body 200, the case constituting the external appearance of the second body 205 may include a second front case 230 and a second rear case 235. A second user input unit 215 may be disposed at a front portion of the second body 205, specifically, on the second front case 230. A third user input unit 245, the microphone 122, the interface unit 170 may be disposed on at least one of the second front case 230 and the second rear case 235.

The first to third user input units 210, 215 and 245 may be generally referred to as a manipulating unit 130, and various methods and techniques can be employed for the manipulation unit so long as they can be operated by the user in a tactile manner. For example, the user input units 130 can be implemented as dome switches, actuators, or touch pad regions that can receive user commands or information according to the user's touch operations, such as pressing, pushing, swiping, and drag-and-drop, or may be implemented in the form of a rotatable control wheel or disc, keys or buttons, a jog dial, or a joystick.

In terms of their functions, the first user input unit 210 is used for inputting or entering commands, such as start, end, or scroll, and the second user input unit 215 is used for inputting or entering numbers, characters, or symbols. Also, the third user input unit 245 may support the so-called hot key functions that allow more convenient activation of particular functions for the mobile terminal 100.

The microphone 122 or other sound pick-up device may be appropriately implemented to detect user voice inputs and other sounds. The interface unit 170 may be used as a communication link, passage, or path through which the mobile terminal 100 can exchange data with an external device. For example, the interface unit 170 may be implemented in the form of a connection port for connecting an earphone to the mobile terminal 100 via a fixed or wireless means, a port for short-range communications, such as an Infrared Data Association (IrDA) port, a Bluetooth™ port, a wireless LAN port, and power supply ports for providing power to the mobile terminal 100. Also, the interface unit 170 may be a card socket for accommodating a SIM (Subscriber Identification Module) card or a UIM (User Identity Module) card, or an external card such as a memory card for storing information.

The power supply unit 190 for supplying power to the mobile terminal 100 may be located at the second rear case 235. For example, the power supply unit 190 may be a rechargeable battery that can be detached.

Figure 3:
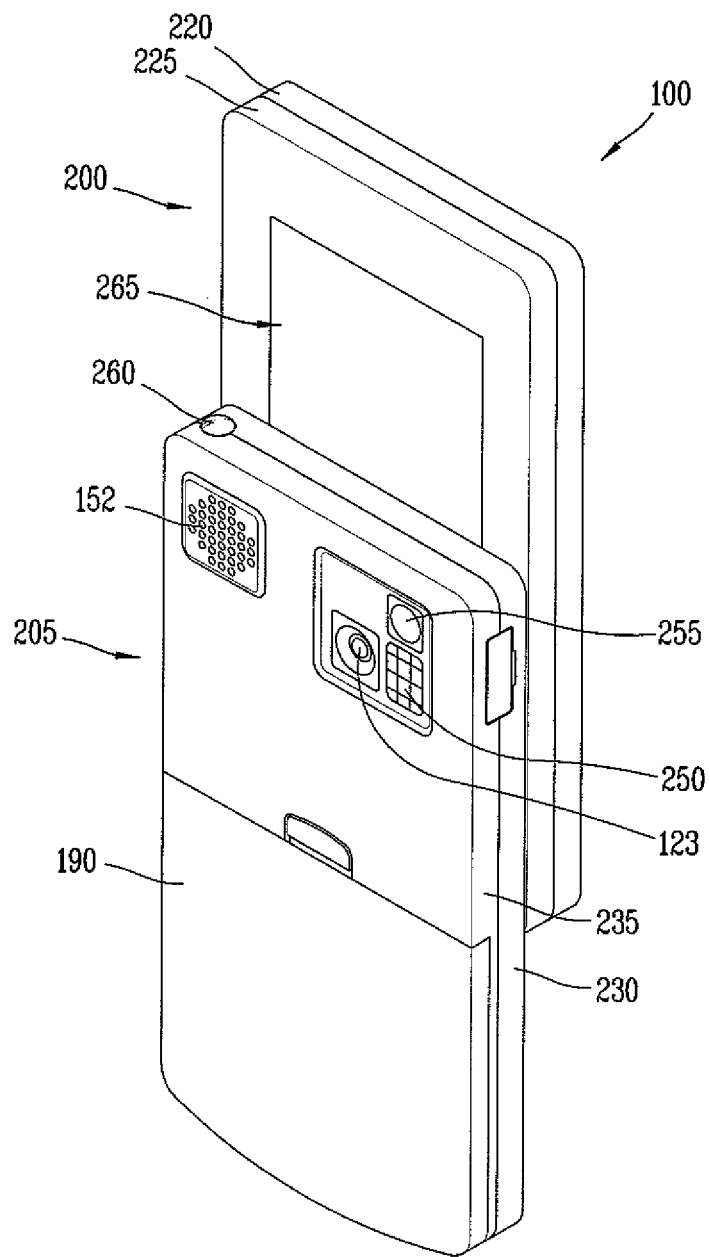
FIG. 3 is a rear perspective view of the mobile terminal illustrated in FIG. 2.

FIG. 3 is a rear perspective view of the mobile terminal of FIG. 2 according to an embodiment of the present invention. As shown in FIG. 3, a camera 123 or other image pick-up device may additionally be disposed on a rear surface of the second rear case 235 of the second body 205. The camera 123 of the second body 205 may have an image capture direction which is substantially opposite to that of the camera 121 of the first body 200, namely, the two cameras may be implemented to face towards opposing directions, such as front and rear, and may support a different number of pixels having a different resolution than the camera 121 of the first body.

For example, the camera 121 of the first body 200 may operate with a relatively lower resolution to capture an image (s) of the user's face and immediately transmit such image(s) to another party in real-time during video call communication or the like in which reverse link bandwidth capabilities may be limited. Also, the camera 123 of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 123. When an image of the subject is captured with the camera 123 of the second body 205, the flash 250 illuminates the subject. The mirror 255 allows the user to see himself when he wants to capture his own image during self-image capturing by using the camera 123 of the second body 205.

The second rear case 235 may further include an audio output module 152. The audio output module 152 may support stereophonic sound functions in conjunction with the audio output module 152 of the first body 200 and may be also used for sending and receiving calls in a speaker phone mode.

A broadcast signal receiving antenna 260 may be disposed externally or internally at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200. The other part of the slide module 265 may be disposed on the second front case 230 of the second body 205, which may not be exposed as shown in FIG. 3. The second camera 123 and other components may be disposed on the second body 205, but such configuration is not meant to be limited.

For example, one or more of the elements, for example, 260, 123, 250 and 152, which are disposed on the second rear case 235, may be mounted on the first body 200, mainly, on the first rear case 225. In this case, those elements disposed on the first rear case 225 can be protected or covered by the second body 205 in the closed configuration. In addition, even if a separate camera is not provided at the second body 205, the camera module 121 may be configured to rotate or otherwise be moved to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems. Such communication systems in which the mobile terminal 100 according to the present invention can operate will now be described with reference to FIG. 4.

Such communication systems may use different air interfaces and/or physical layers. For example, air interfaces utilized by the communication systems include frequency division multiple access (FDMA), time division multiple access (TDMA), code division multiple access (CDMA), and universal mobile telecommunications system (UMTS) (in particular, long term evolution (LTE)), and global system for mobile communications (GSM). As a non-limiting example, the description hereafter relates to a CDMA communication system, but such teachings apply equally to other types of systems.

Figure 4:
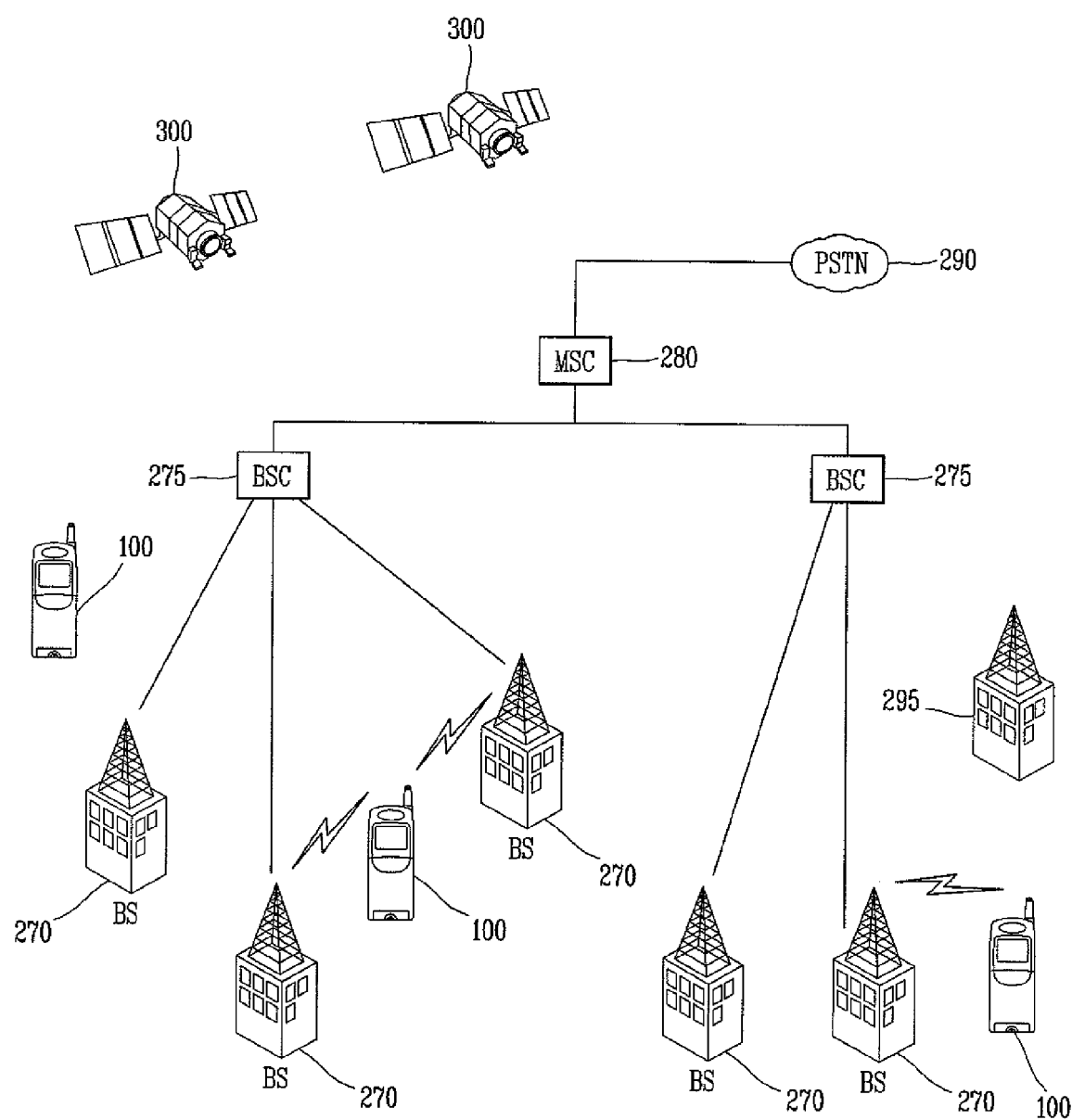
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors or regions, each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum, for example, 1.25 MHz or 5 MHz.

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The BS 270 may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100. In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals 100 may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engage in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

With reference to FIG. 1, the user input unit 130 generates key input data according to a key input by a user to control an inter-recharging operation of the mobile terminal 100, and the display module 151 of the output unit 150 outputs information processed in relation to the inter-recharging in the mobile terminal 100. For example, as shown in FIGS. 7A-7D, when the mobile terminal 100 is in an inter-recharge mode, various menus for performing inter-recharging are displayed, and an icon for the inter-recharging and a measured current and voltage are displayed.

The audio output module 152 of the output unit 150 outputs an audio signal related to a function, for example, call signal reception sound or a message reception sound, performed in the mobile terminal 100, and also outputs various audio signals related to inter-recharging. The audio output module 152 may include a speaker or a buzzer.

The storage unit 160 may include a program used for processing and controlling operation performed by the controller 180, and perform a function for temporarily storing data related to inter-recharging, for example, inter-recharging history.

In addition to performing a general controlling operation of the mobile terminal 100, the controller 180 measures the amount of current induced to the primary coil of a battery and a remaining battery capacity, sets and operates a menu for inter-recharging, displays icons, and performs other relevant general operations. The measurement of the amount of current induced to the primary coil or induction coil of the battery and the remaining battery capacity may not be directly performed by the controller 180, but performed by the sensing unit 140 shown in FIG. 1.

The inter-recharging method of the mobile terminal 100 will now be described with reference to the accompanying drawings.

Figure 5:
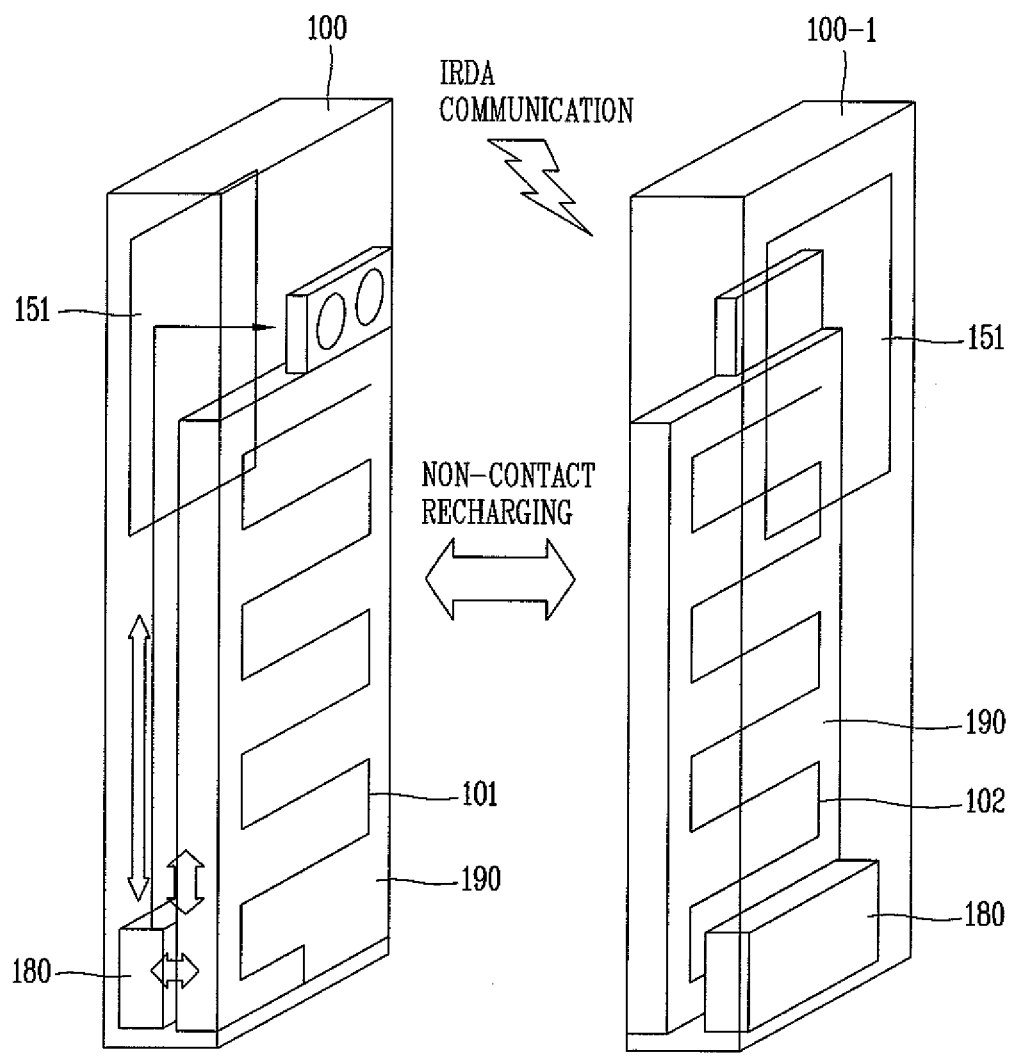
FIG. 5 is a schematic block diagram of the mobile terminal having a recharge menu setting function according to an embodiment of the present invention.
Figures 7A, 7B, 7C, 7D:
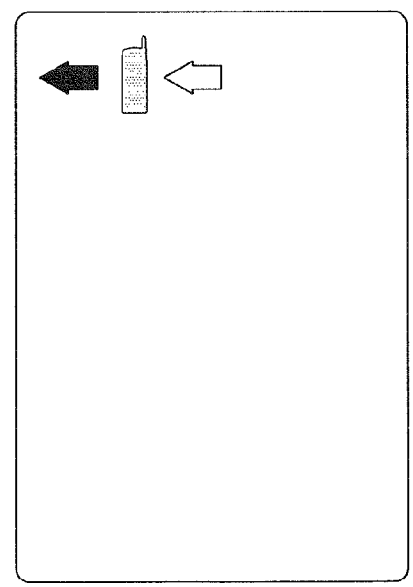
FIGS. 7A-7D show examples of a recharge menu, menu items, a menu, output information, and icons according to an embodiment of the present invention.

FIG. 5 is a schematic block diagram of a mobile terminal 100 having a recharge menu setting function according to an embodiment of the present invention. As shown in FIG. 5, the mobile terminal 100 for performing non-contact inter-recharging includes a user interface for providing a recharge menu to perform inter-recharging with a counterpart mobile terminal 100-1; a coil connected with a recharger or battery 190, to which current is applied when performing non-contact recharging; and a controller 180 for controlling the current flowing to the coil according to a menu set by a user through the recharge menu, and performing a controlling operation for inter-charging with the counterpart terminal. Examples of the user interface are shown in FIGS. 7A-7D. In particular, FIG. 7A shows a recharge menu with various menu items, FIG. 7B shows various settings for counterpart terminal recharge, FIG. 7C shows various settings for output information, and FIG. 7D shows icons indicating which one of the terminals is being charged.

The reference designations "100" and "100-1" are used to designate the mobile terminal and counterpart mobile terminal. It is to be understood that each of mobile terminal 100 and counterpart mobile terminal 100-1 has the same capabilities and, therefore, the reference designations are relative.

Namely, when the mobile terminal 100 recharges the mobile terminal 100-1 by using the induction coupling method, the mobile terminal 100 includes the primary coil, which is a magnetic field generating coil 101, while the mobile terminal 100-1 includes the secondary coil or induction coil 102. If the mobile terminal 100-1 recharges the mobile terminal 100, the secondary coil of the mobile terminal 100-1 becomes the primary coil while the primary coil or magnetic field generating coil 101 becomes the secondary coil.

Preferably, the user interface may include displaying and controlling operations or may simply include only the displaying operation. The user interface is an application and hardware configuration for providing the recharge menu, and includes the function of the multimedia module 181 and the display unit 151.

Mobile terminals also serve as multimedia devices and in order to implement complicated functions of the multimedia devices, various hardware or software modifications are made to the mobile terminals. For example, the present invention provides the user interface to allow the user to search or select the function for non-contact recharging easily and conveniently.

According to an embodiment of the present invention, the recharge menu includes 'cradle recharging' and 'inter-recharging between terminals' (referred to as 'inter-recharging menu', hereinafter). In one aspect of the present invention, the inter-recharging menu includes 'recharge counterpart terminal' and 'recharged by counterpart terminal'. The cradle recharging refers to recharging a single mobile terminal 100 at a cradle connected to a power source, and the inter-recharging refers to recharging the mobile terminal 100 by the mobile terminal 100-1 or recharging of the mobile terminal 100-1 by the mobile terminal 100.

If the user selects 'recharge counterpart terminal' from the inter-recharging menu, the controller 180 applies current to the primary coil 101 to recharge the battery 190 of the mobile terminal 100-1 by inductive coupling between the primary coil 101 and the secondary coil 102. The controller 10 displays an inter-recharging icon on the display unit 151.

While recharging is performed, the controller 180 of the mobile terminal 100 performs a short-range communication, such as IrDA communication, with the controller 180 of the counterpart mobile terminal 100-1 to exchange and display battery information such as recharge current, recharge voltage, and recharge status. When a desired recharge level is reached or when a recharge current or a recharge voltage, indicating remaining battery capacity, becomes lower than a recharge current or a recharge voltage of the mobile terminal 100, the controller 180 stops the inter-recharging operation and displays the status of the recharge completion on the display unit 151 to indicate that the recharging stopped.

If the user selects 'recharged by the counterpart terminal,' the controller 180 detects a current induced to the primary coil 101 and displays a non-contact recharge icon on the display unit 151.

Figure 6:
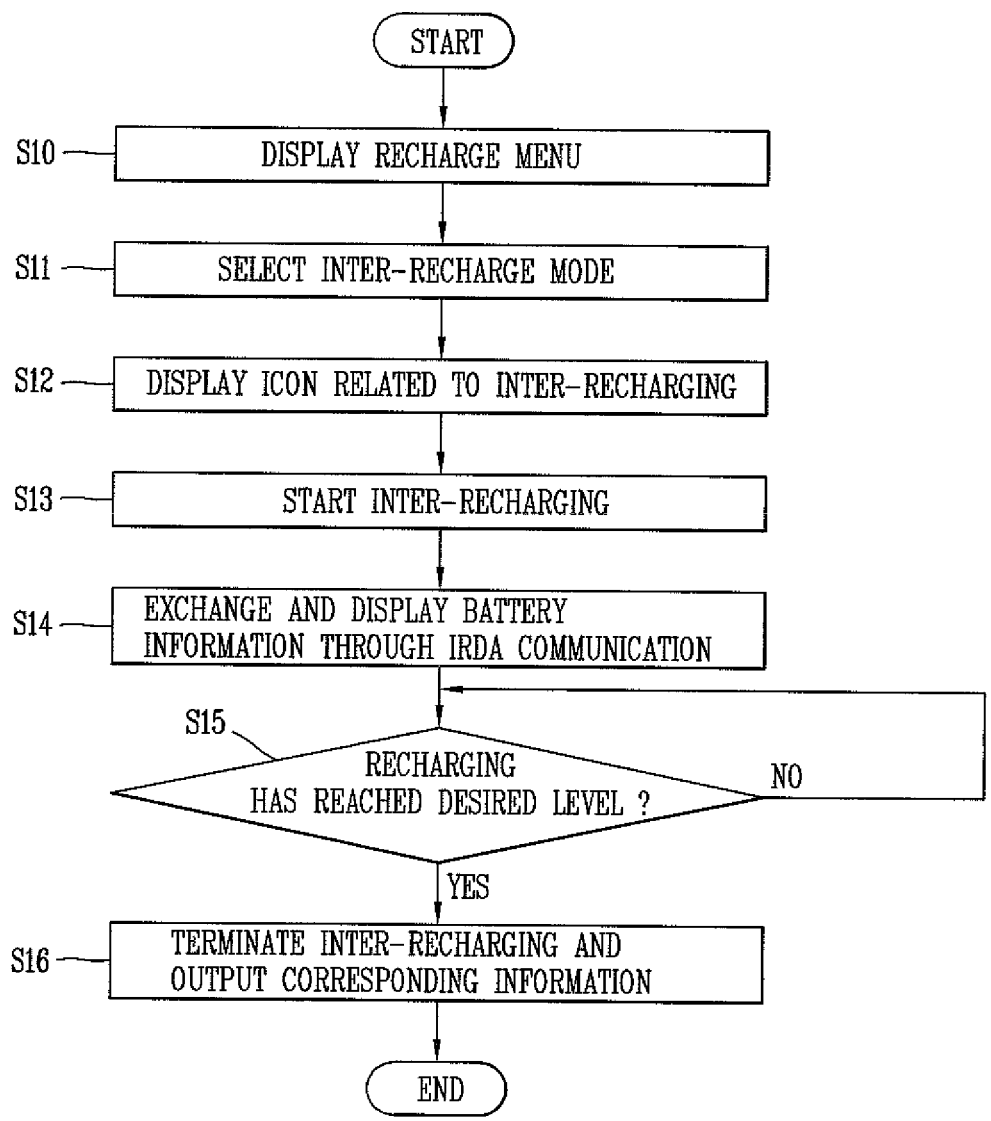
FIG. 6 is a flow chart illustrating an inter-recharging method by the mobile terminal using a non-contact method according to an embodiment of the present invention.

FIG. 6 is a flow chart illustrating an inter-recharging method of a mobile terminal 100 using a non-contact method according to an embodiment of the present invention. As shown in FIG. 6, in order to perform non-contact recharging, the user of the mobile terminal 100 places the mobile terminal close to or in contact with the counterpart mobile terminal 100-1 and manipulates the user input unit 130 of the mobile terminal to input particular key data.

When a particular key data for non-contact recharging is input, the controller 180 reads the recharge menu from the memory 160 and displays the recharge menu on the display unit 151 (S10). Then, the user uses the recharge menu to select whether to perform inter-recharging. In particular, the user selects to recharge the counterpart mobile terminal 100-1 with the user's mobile terminal 100 or selects to charge the user's mobile terminal 100 with the counterpart mobile terminal 100-1.

Further, in addition to the information, such as the recharge time and recharge level, the user may select various information. For example, the user may select to perform a notification method implementing at least one of color, sound, character or particular icon when the recharging is stopped or completed.

When the user selects 'recharging counterpart terminal' from the inter-recharging menu of the recharging menu (S11), the controller 180 applies a recharge current of the battery 190 to the primary coil 101 and displays a counterpart recharge icon on the display unit 151 (S12).

Accordingly, as the current flows across the primary coil 101, the primary coil 101 and the second coil 102 are inductively coupled to generate a magnetic field, thereby starting inter-recharging (S13). The generated magnetic field generates an inductive current at the secondary coil 102 of the counterpart mobile terminal 100-1, and the generated inductive current is charged to the battery 190 of the counterpart mobile terminal 100-1.

While the inter-recharging is being performed, the controller 180 of the mobile terminal 100 performs IrDA communication with an infrared transmitting/receiving unit of the counterpart mobile terminal 100-1 via its infrared transmitting/receiving unit to exchange battery information and various data. and the controller 180 displays the exchanged data on the display unit 151 (S14). Preferably, the battery information includes the remaining battery capacity, current, or voltage flowing across the coil.

Accordingly, the controller 180 of the mobile terminal 100 compares the remaining battery capacity of the mobile terminal 100 or current flowing across the coil to the remaining battery capacity of the counterpart mobile terminal 100-1 or current flowing across the coil of the counterpart mobile terminal 100-1 to check whether non-contact recharging of the counterpart mobile terminal 100-1 has reached a desired level (S15).

If the non-contact recharging of the mobile terminal 100-1 has not reached the desired level, the controller 180 continues the recharging operation. If the non-contact recharging of the mobile terminal 100-1 has reached the desired level, the controller 180 stops the inter-recharging operation and informs the user about the completion of the inter-recharging (S16). In order to inform the user about the completion of the inter-recharging, an icon, a character or a color may be displayed on the display module 151 or a certain sound may be generated via the audio output module 152.

As disclosed above, when the non-contact inter-recharging is performed between mobile terminals, the recharge menu is provided to a first mobile terminal such that the user of the first mobile terminal can select to recharge the second mobile terminal or the user's own mobile terminal by setting the recharge menu and operating the inter-recharging according to the selected menu, rather than simply inter-recharging between the first and second mobile terminals without any setting.

In the embodiments of the present invention, the above-described non-contact re-charging method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, and an optical data storage device. The computer-readable medium also includes implementations in the form of carrier waves or signals such as transmission via the Internet. The computer may include the controller 180 of the terminal.

As so far described, in the present invention, for a non-contact recharging of a mobile terminal, the inter-recharging menu is provided or displayed to allow the user to set various menu items or settings required for recharging a counterpart terminal or the user's own terminal, to thus simply and accurately recharge the terminals. The method for setting the menu for non-contact inter-recharging according to the present invention is not limited to the configurations and methods of the embodiments described above, but some or the entirety of the embodiments may be selectively combined into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal having a recharge menu setting function, the mobile terminal comprising:
    a user interface comprising a display providing a recharge menu to perform inter-recharging with a counterpart terminal;
    a user input unit configured to receive key data for setting the recharge menu;
    a short range communication unit configured to perform infrared communication with the counterpart terminal;
    a coil connected with a recharger, to which current is applied when the inter-recharging is performed by non-contact recharging; and
    a controller configured to control the current flowing to the coil according to the key data input through the recharge menu, and to perform a controlling operation during the inter-recharging with the counterpart terminal,
    wherein the non-contact recharging is performed according to inductive coupling,
    wherein during the inter-recharging, the controller exchanges battery information with the counterpart terminal by performing the infrared communication with the counterpart terminal and causes the display to display the battery information,
    wherein the recharge menu comprises an inter-recharge menu including a first menu item for recharging the counterpart terminal and a second menu item for recharging the mobile terminal by the counterpart terminal, the recharge menu further comprising a recharge time, a recharge level and a menu item for setting output information when the recharging is completed or stopped, and
    wherein the controller is further configured to:
        cause the display to display a counterpart recharge icon and charging information of the counterpart terminal when the counterpart terminal is recharged by the non-contact recharging in response to selection of the first menu item from the inter-recharge menu; and
        cause the display to display a non-contact recharge icon and charging information of the mobile terminal when the mobile terminal is recharged by the counterpart terminal in response to selection of the second menu item from the inter-recharge menu.

2. The mobile terminal of claim 1, wherein the coil is operated as a primary coil when the counterpart terminal is recharged by the mobile terminal and the coil is operated as a secondary coil when the mobile terminal is recharged by the counterpart terminal.

3. The mobile terminal of claim 1, wherein the recharge menu further comprises a menu for recharging by connecting to a recharging device.

4. The mobile terminal of claim 3, wherein the user input unit is further configured to receive an input for selecting the menu for recharging by connecting to the recharging device from the recharge menu such that a battery of the mobile terminal is recharged via the recharging device connected to a power source in response to the input.

5. The mobile terminal of claim 1, wherein the output information comprises at least a color, a sound, a character, or a recharge icon to be set.

6. The mobile terminal of claim 1, wherein the display displays the recharge menu when a specific key data is received via the user input unit, and further displays information about a recharge menu setting state and operation.

7. The mobile terminal of claim 6, wherein the controller is further configured to exchange current information by communicating with the counterpart terminal by performing the infrared communication with the counterpart terminal via the short range communication unit during the non-contact recharging.

8. The mobile terminal of claim 1, wherein the controller is further configured to cause the display to indicate that the inter-recharging has been stopped when the inter-recharging stops.

9. The mobile terminal of claim 1, wherein:
    the menu item for setting output information allows a user to set the output information; and
    the output information comprises visual information and audible information.

10. The mobile terminal of claim 9, wherein the visual information comprises an icon, a character, or a color that is displayed via the display.

11. The mobile terminal of claim 9, wherein the audible information comprises a sound generated via an audio output module of the mobile terminal.

12. The mobile terminal of claim 1, wherein the battery information comprises a measured current and voltage of a battery.

13. A method for performing non-contact recharging using inductive coupling to inter-recharge a mobile terminal, the method comprising:
    providing, on a display of the mobile terminal, a recharge menu for performing the non-contact recharging;
    displaying, on the display, an inter-recharge menu for setting a recharging of the mobile terminal or a recharging of a counterpart terminal,
    wherein the recharge menu comprises the inter-recharge menu, the inter-recharge menu including a first menu item for recharging the counterpart terminal and a second menu item for recharging the mobile terminal by the counterpart terminal, the recharge menu further comprising a recharge time, a recharge level and a menu item for setting output information when the recharging is completed or stopped;
    performing the inter-recharging with the counterpart terminal by controlling current flowing across a coil according to either the first menu item or the second menu item selected from the inter-recharge menu;
    exchanging battery information with the counterpart terminal by performing infrared communication with the counterpart terminal and displaying the battery information on the display during the inter-recharging;

displaying a counterpart recharge icon and charging information of the counterpart terminal when the counterpart terminal is recharged by the non-contact recharging in response to selection of the first menu item from the inter-recharge menu; and displaying a non-contact recharge icon and charging information of the mobile terminal when the mobile terminal is recharged by the counterpart terminal in response to selection of the second menu item from the inter-recharge menu; and displaying a state of the inter-recharging by comparing the exchanged battery information.

14. The method of claim 13, wherein performing the inter-charging comprises:

operating the coil as a primary coil when the counterpart terminal is recharged; and operating the coil as a secondary coil when the mobile terminal is charged by the counterpart terminal.

15. The method of claim 13, wherein the recharge menu further comprises a menu for recharging by connecting to a recharging device.

16. The method of claim 13, wherein the output information comprises at least a color, a sound, a character, or setting a recharge icon.

* * * * *